(12) United States Patent
Neddermann et al.

(10) Patent No.: US 12,109,645 B2
(45) Date of Patent: Oct. 8, 2024

(54) ULTRASONIC WELDING DEVICE

(71) Applicant: Infineon Technologies AG, Neubiberg (DE)

(72) Inventors: Till Neddermann, Meschede (DE); Michal Chajneta, Lippstadt (DE); Alparslan Takkac, Meschede (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/235,428

(22) Filed: Aug. 18, 2023

(65) Prior Publication Data

US 2023/0390859 A1    Dec. 7, 2023

Related U.S. Application Data

(62) Division of application No. 17/245,182, filed on Apr. 30, 2021, now Pat. No. 11,772,187.

(51) Int. Cl.
*B23K 20/00* (2006.01)
*B23K 20/10* (2006.01)
*B23K 101/36* (2006.01)
*B23K 103/12* (2006.01)

(52) U.S. Cl.
CPC ........ *B23K 20/106* (2013.01); *B23K 2101/36* (2018.08); *B23K 2103/12* (2018.08)

(58) Field of Classification Search
CPC .... B23K 20/106; B23K 20/10; B23K 20/002; B29C 66/81433; B29C 66/81435
See application file for complete search history.

(56) References Cited

U.S. PATENT DOCUMENTS

| | | | | |
|---|---|---|---|---|
| 4,956,213 A | * | 9/1990 | Masuda | B29C 65/08 |
| 5,525,172 A | * | 6/1996 | Cadiou | B06B 3/02 |
| | | | | 156/580.2 |
| 5,746,856 A | * | 5/1998 | Hendershot | B29C 66/71 |
| | | | | 156/580.2 |
| 5,816,472 A | * | 10/1998 | Linn | B23K 20/004 |
| | | | | 228/1.1 |
| 6,494,976 B1 | * | 12/2002 | Hayashi | B23K 33/00 |
| | | | | 156/580.2 |
| 6,523,732 B1 | * | 2/2003 | Popoola | B23K 20/106 |
| | | | | 228/110.1 |
| 6,824,630 B2 | * | 11/2004 | Oishi | B29C 65/08 |
| | | | | 156/580.2 |

(Continued)

*Primary Examiner* — Erin B Saad
(74) *Attorney, Agent, or Firm* — Murphy, Bilak & Homiller, PLLC

(57) ABSTRACT

A method of welding includes providing first and second joining partners, providing a welding apparatus that includes a sonotrode comprising a structured working surface, arranging the first and second joining partners to contact one another, and forming a welded connection between the first and second joining partners by contacting the first joining partner with the structured working surface and vibrating the sonotrode at an ultrasonic frequency, wherein the structured working surface comprises a plurality of apexes, a plurality of nadirs between immediately adjacent ones of the apexes, and planar sidewalls that extend between the nadirs and the apexes, and wherein for each of the apexes the planar sidewalls on either side of the respective apex extend along first and second planes that intersect one another at an acute angle.

10 Claims, 6 Drawing Sheets

(56) References Cited

U.S. PATENT DOCUMENTS

| | | | |
|---|---|---|---|
| 7,337,938 B2* | 3/2008 | Noro | B29C 66/1122 |
| | | | 228/1.1 |
| 7,793,815 B2* | 9/2010 | Shimizu | B29C 66/8322 |
| | | | 228/110.1 |
| 8,801,882 B2 | 8/2014 | Regenberg et al. | |
| 9,550,252 B2* | 1/2017 | Takayashiki | H01R 43/0207 |
| 10,005,150 B2* | 6/2018 | Kanryo | H01G 13/006 |
| 10,864,597 B2* | 12/2020 | Yoshida | B24B 19/02 |
| 11,141,925 B2* | 10/2021 | Wang | B29C 66/73921 |
| 11,458,562 B2* | 10/2022 | Rühl | H01R 43/0207 |
| 2010/0015466 A1* | 1/2010 | Yoshioka | B23K 20/10 |
| | | | 428/615 |
| 2012/0125520 A1* | 5/2012 | Yoshida | B24C 1/00 |
| | | | 156/580.2 |
| 2018/0151533 A1* | 5/2018 | Yoneda | H01L 24/16 |
| 2020/0227877 A1* | 7/2020 | Nakamura | B23K 20/2336 |
| 2021/0086290 A1* | 3/2021 | Wang | B23K 20/106 |
| 2021/0129453 A1* | 5/2021 | Wang | B29C 66/45 |

* cited by examiner

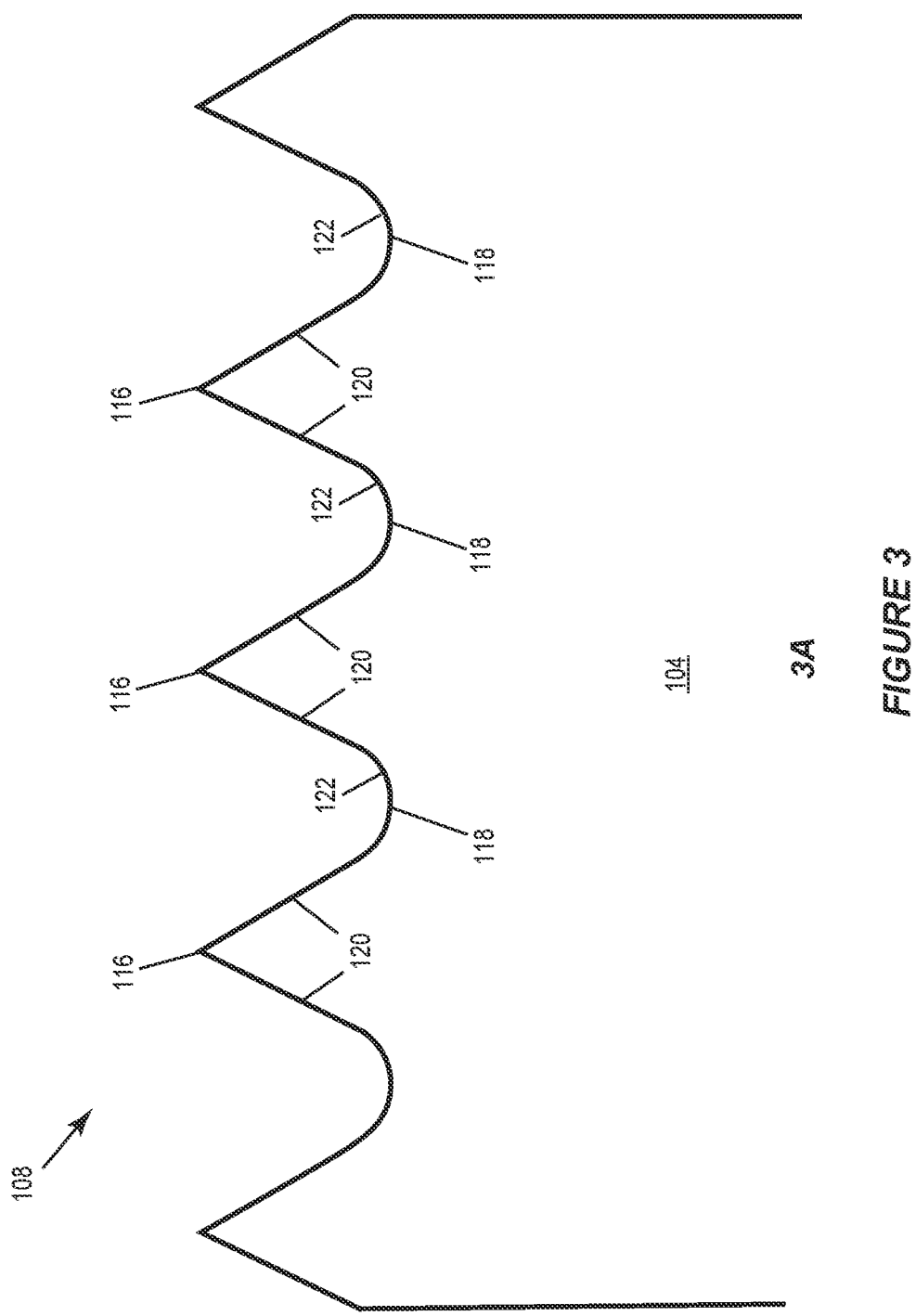

ULTRASONIC WELDING DEVICE

BACKGROUND

Welding is one technique used to form electrical interconnections in electronics applications. For example, power electronics applications may use welding to form mechanical and electrical interconnections in power modules. To ensure electrical and mechanical reliability of the welded joint over the usable lifetime of the device, the welded joint must have a minimum size and strength. Moreover, an area must be reserved around the footprint of the welded joint to allow the welded material to expand during the welding process. The collective area needed to meet these requirements is dictated by the materials and welding techniques used. By reducing the collective area needed to form a welded joint, a greater proportion of board area can be dedicated to electronic components, such as semiconductor dies, passive devices, etc. It is therefore desirable to provide a welding process that reduces the footprint of a welded joint without sacrificing electrical and mechanical reliability.

SUMMARY

An ultrasonic welding apparatus is disclosed. According to an embodiment, the ultrasonic welding apparatus comprises a sonotrode comprising a structured working surface that comprises a plurality of apexes, a plurality of nadirs between immediately adjacent ones of the apexes, and planar sidewalls that extend between the nadirs and the apexes, and for each of the apexes the planar sidewalls on either side of the respective apex extend along first and second planes that intersect one another at an acute angle.

Separately or in combination, the structured working surface further comprises a plurality of curved surfaces that extend between two of the planar sidewalls, and each of the nadirs are formed by the curved surfaces.

Separately or in combination, the curved surfaces form rounded depressions that extend between the two of the planar sidewalls.

Separately or in combination, for each of the apexes the planar sidewalls on either side of the apex merge with one another to form an acute point at the apex.

Separately or in combination, a radius of the rounded depressions is equal to or less than 0.5 of a pitch of the apexes on either side of the respective rounded depression.

Separately or in combination, the radius of the rounded depressions is between to 0.1 and 0.4 of the pitch.

Separately or in combination, the first and second planes intersect one another at an angle of between 50 degrees and 70 degrees.

Separately or in combination, the first and second planes intersect one another at an angle of between 55 degrees and 60 degrees.

Separately or in combination, a radius of the rounded depressions is between 0.2 and 0.3 of a pitch of the apexes on either side of the rounded depressions, and the first and second planes intersect one another at an angle of between 55 degrees and 60 degrees.

Separately or in combination, the welding apparatus further comprises a transducer that is mechanically coupled to the sonotrode and is configured to cause the sonotrode to vibrate at an ultrasonic frequency.

According to another embodiment, the ultrasonic welding apparatus comprises a sonotrode comprising a structured working surface that comprises a plurality of apexes, a plurality of nadirs between immediately adjacent ones of the apexes, and a plurality of curved surfaces that extend between immediately adjacent ones of the apexes, and each of the nadirs are formed by the curved surfaces.

Separately or in combination, a vertical displacement between each of the nadirs and the apexes on either side of the respective nadir is greater than 0.5 of a pitch of the apexes on either side of the respective nadir.

Separately or in combination, a vertical displacement between each of the nadirs and the apexes on either side of the respective nadir is greater than 0.5 of a pitch of the apexes on either side of the respective nadir.

Separately or in combination, the vertical displacement is between 0.55 and 0.73 of the pitch.

Separately or in combination, the working surface further comprises planar sidewalls that extend from the curved surfaces and intersect with one another to form the apexes, the curved surfaces form rounded depressions that extend between two of the planar sidewalls, and a radius of the rounded depressions is equal to or less than 0.5 of a pitch of the apexes on either side of the respective rounded depression.

A method of welding is disclosed. According to an embodiment, the method comprises providing first and second joining partners, providing a welding apparatus that comprises a sonotrode with a structured working surface, arranging the first and second joining partners to contact one another, and forming a welded connection between the first and second joining partners by contacting the first joining partner with the structured working surface and vibrating the sonotrode at an ultrasonic frequency, wherein the structured working surface comprises a plurality of apexes, a plurality of nadirs between immediately adjacent ones of the apexes, and planar sidewalls that extend between the nadirs and the apexes, wherein for each of the apexes the planar sidewalls on either side of the respective apex extend along first and second planes that intersect one another at an acute angle, or wherein the structured working surface further comprises a plurality of curved surfaces that extend between immediately adjacent ones of the apexes and each of the nadirs are formed by the curved surfaces.

Separately or in combination, the first joining partner is a power module terminal, and the second joining partner a structured metal region of a power module substrate.

Separately or in combination, at least one of the first and second joining partners comprise copper.

Separately or in combination, the structured working surface comprises the plurality of curved surfaces, each of the curved surfaces form rounded depressions that extend between the two of the planar sidewalls, and the radius of the rounded depressions is between to 0.1 and 0.4 of a pitch of the apexes on either side of the rounded depressions.

Separately or in combination, for each of the apexes the planar sidewalls on either side of the respective apex extend along the first and second planes that intersect one another at the acute angle, and the acute angle is between 50 degrees and 70 degrees.

Separately or in combination, a vertical displacement between each of the nadirs and the apexes on either side of the respective nadir is greater than 0.5 of a pitch of the apexes on either side of the respective nadir.

BRIEF DESCRIPTION OF THE FIGURES

The elements of the drawings are not necessarily to scale relative to each other. Like reference numerals designate corresponding similar parts. The features of the various illustrated embodiments can be combined unless they

FIGS. 3A, 3B and 3C, depicts a cross-sectional view of a sonotrode that may be used in an ultrasonic welding technique, according to an embodiment. FIG. 3A depicts a cross-sectional view of the sonotrode, FIG. 3B depicts a cross-sectional view of the sonotrode with geometric references pertaining to the pitch and vertical depth of the structured working surface of the sonotrode, and FIG. 3C depicts a cross-sectional view of the sonotrode with geometric references pertaining to the angle of the sidewalls and radius of curved surfaces between the sidewalls, according to an embodiment.

DETAILED DESCRIPTION

Embodiments of an ultrasonic welding apparatus and corresponding method of welding are described herein. The welding apparatus and method are advantageously well-suited to reliably form a welded joint with high mechanical strength and a well-controlled footprint. To this end, the welding apparatus comprises a sonotrode with a structured working surface with apexes and nadirs that are arranged in an advantageous geometry. One advantageous aspect of this geometry is a steep angle of orientation in the planar walls of the structured working surface that extend between the apexes and nadirs. Another advantageous aspect of this geometry is curved depressions between the planar walls of the structured working surface which form the nadirs. These features individually or in combination create a large volume for deformed material to flow in between the protrusions of the structured working surface, thereby mitigating the amount of material that is pushed outside of the periphery of the sonotrode during the ultrasonic welding process. The resultant welded joint has greater electrical and mechanical reliability for a given contact area. This can increase the density of welded connections and/or decrease the spacing between the welded connections and other electronic components such as semiconductor devices.

Figure 1:
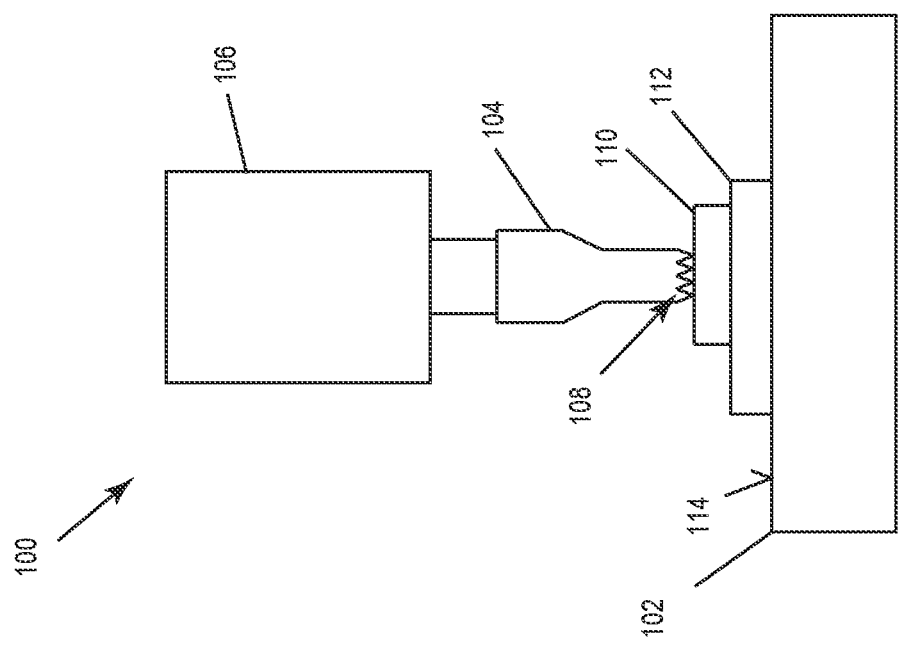
FIG. 1 depicts a welding apparatus and joining partners, according to an embodiment.

Referring to FIG. 1, a welding apparatus 100 comprises an anvil 102, a sonotrode 104 and a transducer 106. The sonotrode 104 comprises a structured working surface 108. The structured working surface 108 has a pattern of protrusions that form a non-planar surface profile. The transducer 106 is mechanically coupled to the sonotrode 104 and is configured to cause the sonotrode 104 to vibrate at ultrasonic frequencies in a process that will be described in further detail below. The anvil 102 is a flat and immovable surface that accommodates the placement of joining partners thereon.

The welding apparatus 100 can be used to form a welded connection according to the following ultrasonic welding technique. First and second joining partners 110, 112 are provided and arranged on the anvil 102. Generally speaking, the first and second joining partners 110, 112 can comprise any materials that can be fused together through a combination of heat and pressure. Examples of these materials include metals such as copper, aluminium, nickel, gold, silver, bronze, tin, etc., and alloys thereof, and thermoplastics such as polycarbonates, polyethene, etc. The first and second joining partners 110, 112 are arranged on the anvil 102 with the first joining partner 110 disposed above the second joining partner 112. The structured working surface 108 of the sonotrode 104 is brought into contact with the first joining partner 110. The transducer 106 causes the sonotrode 104 to vibrate at an ultrasonic frequency. In this context, an ultrasonic frequency refers to any frequency at or above 10 KHz (kilohertz). Exemplary values for the ultrasonic frequency are in the range of 10 KHz to 150 KHz. Specific frequency values for the ultrasonic frequency may be 20 KHz, 30 KHz, or 40 KHz, for example. The sonotrode 104 may be vibrated in an up-and-down direction that is perpendicular to the upper surface 114 of the anvil 102 or in a side-to-side direction that is parallel to the upper surface 114 of the anvil 102. Generally speaking, the amplitude of the vibrations may be in the range of 0.01 mm (millimeters) to 0.1 mm. The vibration of the sonotrode 104 brings the first and second joining partners 110, 112 into a relative oscillating movement with one another. At this time, the first and second joining partners 110, 112 may be pressed together by a normal force. The normal force may be applied using, e.g., pneumatic (air) pressure, a hydraulic system, a spindle, an electromagnetic actor/linear motor, etc. The oscillation of the first and second joining partners 110, 112 creates friction at the interface between the first and second joining partners 110, 112, which in turn heats the material in the vicinity of the interface between the first and second joining partners 110, 112. As a result, the first and second joining partners 110, 112 fuse together to create a welded joint.

Figure 2:
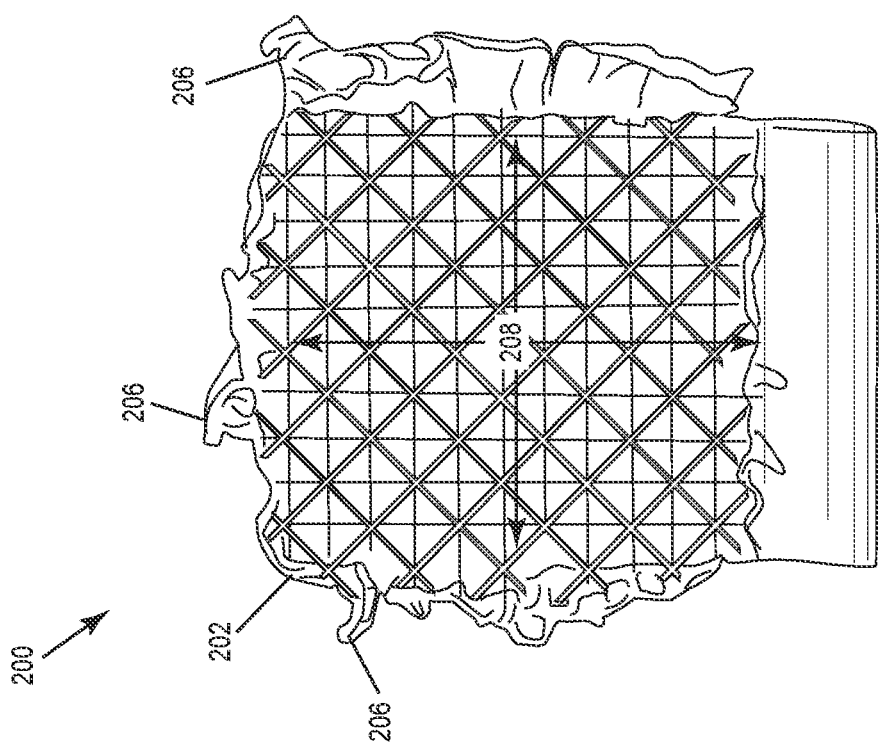
FIG. 2 depicts a welded joint that is formed by an ultrasonic welding technique, according to an embodiment.

Referring to FIG. 2, a welded joint 200 that is created by an ultrasonic welding process is depicted, according to an embodiment. In this example, the welded joint 200 is between two joining partners that are each substantially pure copper structures. The welded joint 200 is shown from above the upper joining partner that faces the sonotrode during the welding process. This welded joint 200 suffers from the drawback of uneven distribution of material. In particular, the material of the joining partners is squeezed to the outer periphery 202 in the depicted direction 208. Moreover, burrs 206 may form at the outer periphery 202 of the welded joint 200. This expansion of the welded joint 200 may cause unwanted electrical shorts and may place unwanted mechanical stress on an underlying substrate underneath the welded joint 200.

Referring to FIG. 3A, a structured working surface 108 of a sonotrode 104 is depicted, according to an embodiment. The structured working surface 108 comprises a plurality of apexes 116 and a plurality of nadirs 118 arranged in a regular pattern. The apexes 116 are locations on the structured working surface 108 that form local maximums. The nadirs 118 are locations on the structured working surface 108 that form local minimums. Each of the apexes 116 in the plurality may be coextensive with a single plane such that the sonotrode 104 can be brought into contact with another planar surface and each of the apexes 116 contact this planar surface. Likewise, each of the nadirs 118 may be coextensive with a single plane that is vertically offset from the vertical plane of the apexes 116. The structured working surface 108 further comprises planar sidewalls 120 that extend between the nadirs 118 and the apexes 116. The planar sidewalls 120 are substantially planar surfaces. This means that the planar sidewalls 120 extend along a single plane to the extent that this practically achievable within process tolerances of manufacturing techniques for forming the sonotrode 104. The structured working surface 108 further comprises a plurality of curved surfaces 122 that extend between two of the planar sidewalls 120. Each of the nadirs 118 are formed by the curved surfaces 122. That is, the nadirs 118 correspond to a lowest point on the curved surfaces 122.

Figure 3:
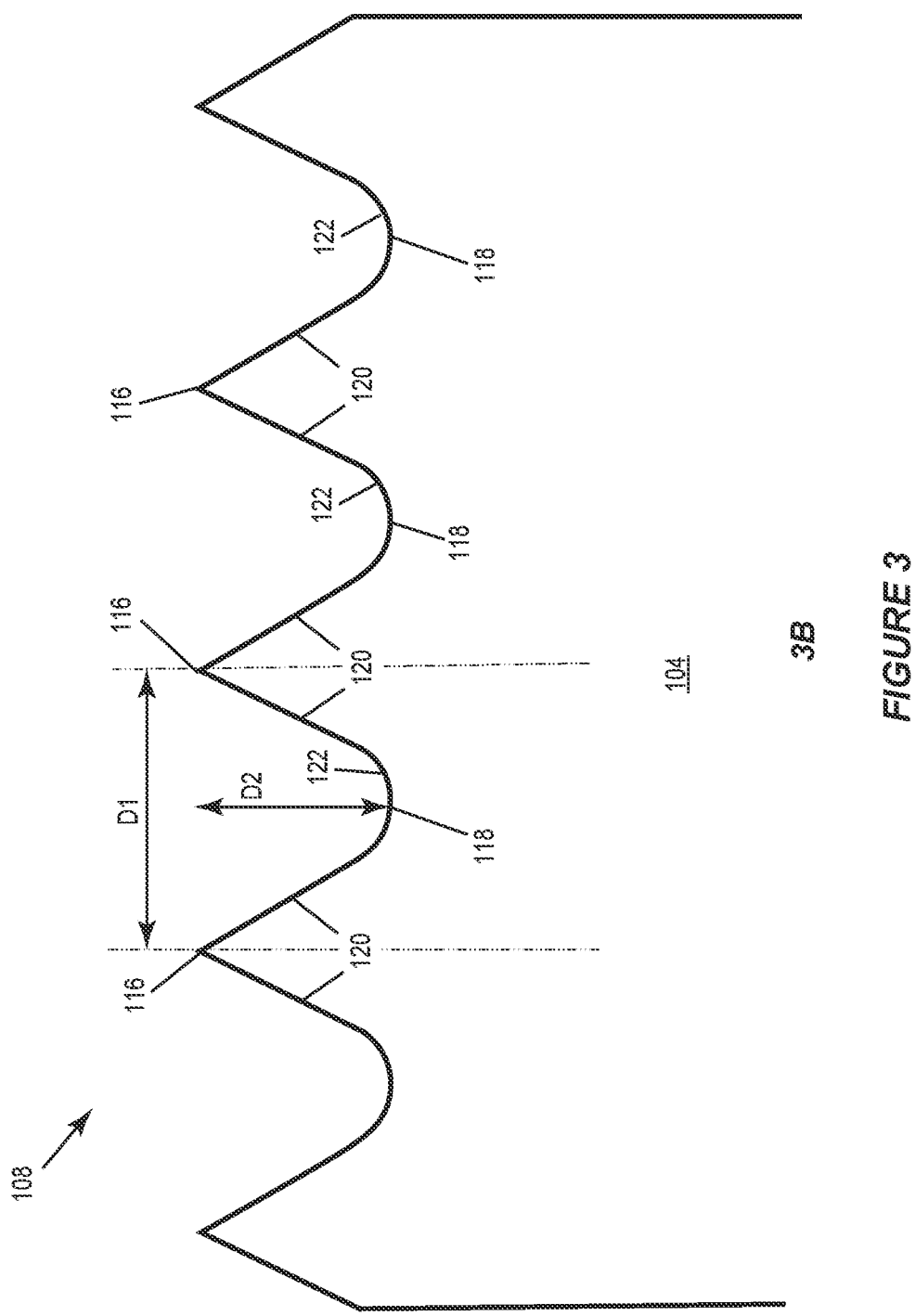
FIG. 3, which includes
Figure 3:
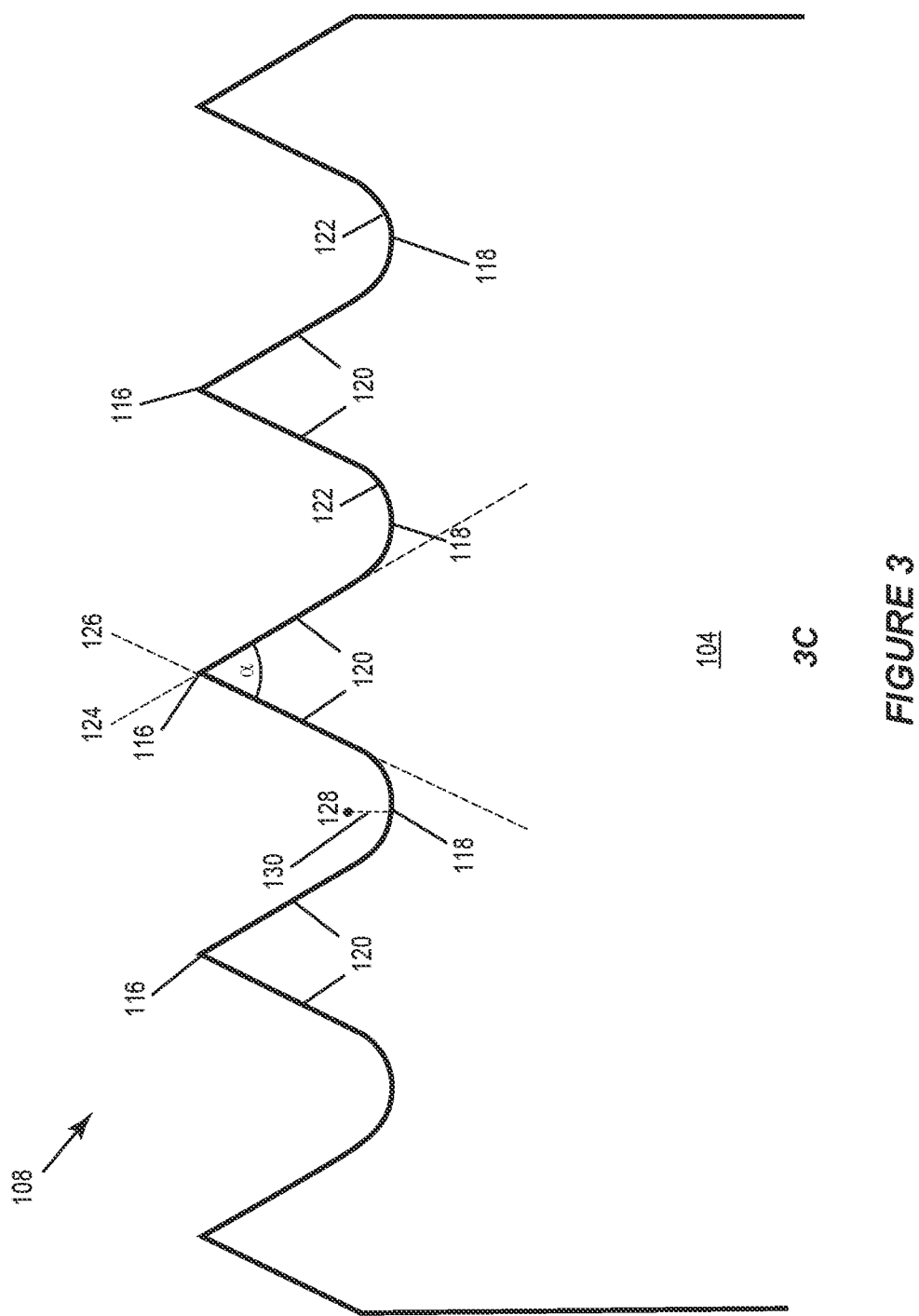

The cross-sectional profile of the structured working surface 108 shown in FIGS. 3A-3C can be realized by pattern of elongated protrusions that extend in a direction that is perpendicular to the cross-sectional plane of the figure. Moreover, as can be appreciated from FIGS. 3 and 4, these elongated protrusions can have a have a crisscrossed pattern such that the cross-sectional profile of the structured working surface 108 shown in FIGS. 3A-3C exists in two different cross-sectional planes that are transverse (e.g., perpendicular) to one another.

Referring to FIG. 3B, the structured working surface 108 is configured such that the apexes 116 are arranged at a pitch. The pitch refers to the lateral separation distance D1 between two immediately adjacent ones of the apexes 116. Each of the apexes 116 in the plurality may be regularly spaced apart from one another by this lateral separation distance D1. Generally speaking, the pitch of the apexes 116 may be any value in the range of 0.05 mm to 5.0 mm. More typically, the pitch of the apexes 116 is in the range of 0.1 mm to 1.0 mm. In one particular embodiment, the pitch of the apexes 116 is 0.5 mm.

Additionally, the structured working surface 108 is configured such that the apexes 116 and the nadirs 118 have a vertical displacement. The vertical displacement is a vertical separation distance D2 between the lowest point of the structured working surface 108 (i.e., one of the nadirs 118) and the highest point of the structured working surface 108 (i.e., one of the apexes 116). The structured working surface 108 may have the same vertical displacement across the pattern of apexes 116 and nadirs 118, meaning that each of the apexes 116 are coextensive with a first plane and each of the nadirs 118 are coextensive with a second plane, and the vertical displacement corresponds to a separation distance between the first and second planes.

According to an embodiment, the vertical displacement between the nadirs 118 and the apexes 116 is greater than 0.5 of the pitch of the apexes 116. In an embodiment, the vertical displacement may be between 0.51 and 1.0 of the pitch. In an embodiment, the vertical displacement is between 0.55 and 0.75 of the pitch. In absolute terms, the structured working surface 108 can have the following relationships between the vertical displacement and the pitch: a vertical displacement of 0.283 mm and a pitch of 0.5 mm which corresponds to a ratio of 0.566, a vertical displacement of 0.333 mm and a pitch of 0.5 mm which corresponds to a ratio of 0.666, or a vertical displacement of 0.364 mm and a pitch of 0.5 mm which corresponds to a ratio of 0.728.

Referring to FIG. 3C, the structured working surface 108 is configured such that for each of the apexes 116 the planar sidewalls 120 on either side of the respective apex 116 extend along first and second planes 124, 126 that intersect one another at an acute angle α. An acute angle refers to an angle that is less than 90 degrees. Accordingly, in this embodiment, the protrusion of the structured working surface 108 which form the apexes 116 comprises outer surfaces (i.e., the planar sidewalls 120) that are oriented closer to one another than 90 degrees. According to an embodiment, the first and second planes 124, 126 intersect one another at an angle α of between 50 degrees and 70 degrees. In one specific embodiment, the first and second planes 124, 126 intersect one another at an angle α of 55 degrees. In one specific embodiment, the first and second planes 124, 126 intersect one another at an angle α of 60 degrees.

Additionally, the structured working surface 108 is configured such that the curved surfaces 122 form a rounded depression between two immediately adjacent ones of the planar sidewalls 120. That is, the curved surfaces 122 are configured to be equidistant to foci 128, wherein the distance to the foci 128 corresponds to a radius 130. According to an embodiment, the radius 130 of the rounded depressions is equal to or less than 0.5 of the pitch of the apexes 116. According to an embodiment, the radius 130 of the rounded depressions is between 0.1 and 0.4 times the pitch. In absolute terms, the structured working surface 108 can have the following relations between the radius 130 of the rounded depressions and the pitch: a radius 130 of 0.15 mm and a pitch of 0.5 mm which corresponds to a ratio of 0.333, or a radius 130 of 0.1 mm and a pitch of 0.5 mm which corresponds to a ratio of 0.2.

The geometric features of the structured working surface 108 described with reference to FIG. 3 mitigate the non-ideal characteristics of the welded joint described with reference to FIG. 2. By way of comparison, a sonotrode may comprise a structured working surface with completely planar sidewalls that extend between acute apex and acute nadirs between each of the apex points, wherein the angle of intersection at each of the apex points and the nadirs is 90 degrees. In that case, the vertical displacement between the apexes and the nadirs is exactly 0.5 times the pitch of the apexes. Such a configuration may cause the problem of the material being squeezed out to the periphery of the welded joint 200 as described with reference to FIG. 2. The structured working surface 108 described with reference to FIG. 3 has an increased volume for displaced material to accumulate between the protrusions in comparison to the above-described arrangement wherein the angle of intersection at each of the apex points and the nadirs is 90 degrees. In more detail, by reducing the intersection angle of the first and second planes 124, 126, the width of the protrusions which form the apexes 116 is narrowed, and thus the area between each of the protrusions is increased. Providing curved depressions in between each of the protrusions may also allow for an increase in the cross-sectional area between each of the apexes 116. Moreover, the curved depressions are also beneficial on the movement of squeezed material such that a beneficial impact on the homogeneity of the welded joint to be described below with reference to FIG. 4, may be observed by incorporating this feature alone.

Figure 4:
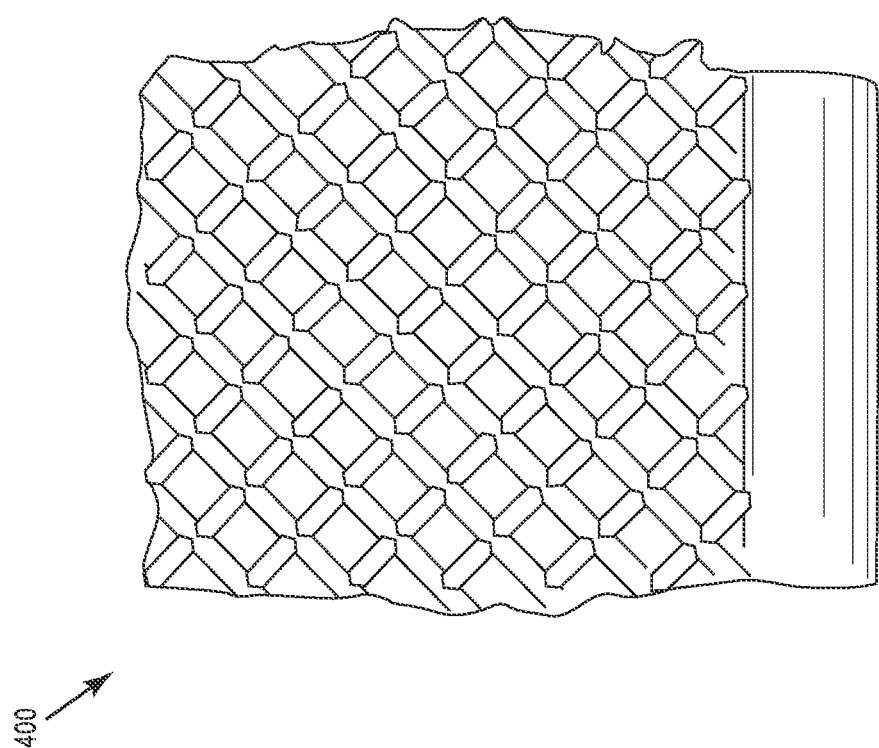
FIG. 4 depicts a welded joint that is formed by an ultrasonic welding technique, according to an embodiment.

Referring to FIG. 4, a welded joint 400 that is created by an ultrasonic welding process is depicted, according to an embodiment. In this case, the welded joint 400 has been formed using a sonotrode 104 which comprises the planar sidewalls 200 extending along first and second planes 124, 126 that intersect one another at an angle of 55 degrees and which comprises a rounded depression which has a radius 130 that is 0.2 times the pitch of the apexes 116. As can be seen, the welded joint 400 of FIG. 4 has improved characteristics in comparison to the welded joint 200 of FIG. 2. In particular, less material is squeezed to the outer periphery of the welded joint 400. The welded joint 400 has greater homogeneity and has fewer burrs at its outer periphery. The likelihood of electrical short and/or the stress placed on the underlying substrate below the welded joint 400 is therefore reduced in comparison to the welded joint 200 of FIG. 2.

Other variations of the structured working surface 108 than the embodiments specifically discussed with reference to FIG. 3 are possible to obtain an arrangement wherein the vertical displacement is greater than 0.5 of a pitch and the above-discussed beneficial increased volume to accommodate squeezed material may be realized. A non-exhaustive list of these variations includes the following. Instead of a configuration wherein the planar sidewalls 120 intersect one another to form the apexes 116 as acute points, the protrusions may have a flat or curved surface which forms the apexes 116. In that case, a vertical displacement of greater than 0.5 of the pitch can be obtained with sufficiently steep angle of inclination for the planar sidewalls 120 and/or through appropriately deepened curved surfaces 122 which form the nadirs 118. Instead of a configuration wherein the curved surfaces 122 forming the nadirs 118 are perfectly rounded, the curved surfaces 122 may have a partial elliptical geometry with two focus 128 points. In that case, a vertical displacement of greater than 0.5 of the pitch can be obtained with sufficiently steep angle of inclination for wherein the planar sidewalls 120 and/or through appropriately configuring the curved surfaces 122. Instead of a configuration wherein the nadirs 122 are formed by curved surfaces, the structured working surface 108 may further comprise trench-like features (e.g., square shaped trenches) disposed between the apexes 116 and adjoining planar sidewalls 120, thereby moving the nadirs 112 further away from the apexes 116 and providing increased volume in the cross-sectional plane.

Generally speaking, the sonotrode 104 described herein is compatible with any ultrasonic welding method, and may be used to form a welded connection between any two joining partners. In one particular embodiment, the sonotrode 104 is used to form a welded connection between a structured metal region of a power module substrate and a power module terminal. The power module substrate may be an isolated metal substrate (IMS), a direct copper bonding (DCB) substrate, or an active metal brazed (AMB) substrate, for example. In each case, the power module substrate comprises a substrate electrically insulating material, e.g., ceramic, and layer of structured metallization e.g., copper, aluminum, etc., and alloys thereof disposed on an upper surface of the substrate. The power module terminal may be an elongated post of conductive material, e.g., copper, aluminum, etc., and alloys thereof, which is used to form an externally accessible connection to the devices (e.g., chips, passives, etc.) mounted on the power module substrate. In this example, an electrically isolated island in the structured metallization region may be welded to the power module terminal by the technique described with reference to FIG. 1, wherein an isolated region of the metallization corresponds to the second joining partner 112 and a portion of the power module terminal corresponds to the first joining partner 110.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A method of welding, comprising:
providing first and second joining partners;
providing a welding apparatus that comprises a sonotrode with a structured working surface;
arranging the first and second joining partners to contact one another; and
forming a welded connection between the first and second joining partners by contacting the first joining partner with the structured working surface and vibrating the sonotrode at an ultrasonic frequency;
wherein the structured working surface comprises a plurality of apexes, a plurality of nadirs between immediately adjacent ones of the apexes, and planar sidewalls that extend between the nadirs and the apexes,
wherein for each of the apexes the planar sidewalls on either side of the respective apex extend along first and second planes that intersect one another at an acute angle,
wherein for each of the apexes the planar sidewalls on either side of the apex merge with one another to form an acute point at the apex,
wherein the structured working surface further comprises a plurality of curved surfaces that extend between immediately adjacent ones of the apexes and each of the nadirs are formed by the curved surfaces, and
wherein a vertical displacement between each of the nadirs and the apexes on either side of the respective nadir is the same throughout the plurality of apexes and the plurality of nadirs.

2. The method of claim 1, wherein the first joining partner is a power module terminal, and wherein the second joining partner a structured metal region of a power module substrate.

3. The method of claim 1, wherein at least one of the first and second joining partners comprise copper.

4. The method of claim 1, wherein each of the curved surfaces form rounded depressions that extend between the two of the planar sidewalls, and wherein the radius of the rounded depressions is between to 0.1 and 0.4 of a pitch of the apexes on either side of the rounded depressions.

5. The method of claim 1, wherein the acute angle is between 50 degrees and 70 degrees.

6. The method of claim 5, wherein a vertical displacement between each of the nadirs and the apexes on either side of the respective nadir is greater than 0.5 of a pitch of the apexes on either side of the respective nadir.

7. The method of claim 1, wherein a vertical displacement between each of the nadirs and the apexes on either side of the respective nadir is the same throughout the plurality of apexes and the plurality of nadirs.

8. The method of claim 1, wherein the first and second planes intersect one another at an angle of between 50 degrees and 70 degrees.

9. The method of claim 8, wherein the first and second planes intersect one another at an angle of between 55 degrees and 60 degrees.

10. The method of claim 1, wherein the welding apparatus further comprises a transducer that is mechanically coupled to the sonotrode and is configured to cause the sonotrode to vibrate at an ultrasonic frequency.

* * * * *

UNITED STATES PATENT AND TRADEMARK OFFICE
CERTIFICATE OF CORRECTION

PATENT NO. : 12,109,645 B2
APPLICATION NO. : 18/235428
DATED : October 8, 2024
INVENTOR(S) : T. Neddermann et al.

It is certified that error appears in the above-identified patent and that said Letters Patent is hereby corrected as shown below:

In the Claims

Column 8, Line 38 (Claim 2) please change "partner a" to -- partner is a --

Signed and Sealed this
Twelfth Day of November, 2024

Katherine Kelly Vidal
*Director of the United States Patent and Trademark Office*